United States Patent [19]
Lou

[11] Patent Number: 5,828,534
[45] Date of Patent: Oct. 27, 1998

[54] WRITE ENABLE DEVICE

[76] Inventor: Eddie Y. S. Lou, 1334 Camerons St., Rowland Heights, Calif. 91748

[21] Appl. No.: 840,974

[22] Filed: Apr. 21, 1997

Related U.S. Application Data

[63] Continuation-in-part of Ser. No. 461,709, Jun. 6, 1995, Pat. No. 5,699,217.

[51] Int. Cl.$^6$ .................................................. G11B 23/02
[52] U.S. Cl. .......................................................... 360/132
[58] Field of Search ................................... 360/132, 133, 360/60

[56] References Cited

U.S. PATENT DOCUMENTS

| | | | |
|---|---|---|---|
| 4,685,017 | 8/1987 | Swinburne et al. | 360/60 |
| 4,754,359 | 6/1988 | Molnar | 360/132 |
| 4,796,138 | 1/1989 | Ono | 360/133 |
| 4,811,150 | 3/1989 | Sciggs et al. | 360/132 |
| 5,121,279 | 6/1992 | Saeki et al. | 360/133 |
| 5,184,255 | 2/1993 | Lowry et al. | 360/132 |
| 5,210,061 | 5/1993 | Blackston | 360/133 |
| 5,418,672 | 5/1995 | Tischler | 360/132 |
| 5,539,600 | 7/1996 | Lee et al. | 360/133 |

*Primary Examiner*—Allen T. Cao

[57] ABSTRACT

A write enabling device 10 includes a hexahedron-shaped planar member or a planar member fabricated from resilient material. Write enabling device 10 is sized to be snugly and tightly accepted and retained by recording safety cavity 16 of a recording medium such as a tape cassette. When write enabling device 10 is inserted into cavity 16, the writing (recording) feature of a recording machine is either enabled or disabled depending upon the recording machine. In conventional recording machine, patching up of cavity 16 recording enabled. For better retention in cavity 16, many different kinds of methods are used, for example—resilience of material used, use of groove(s), friction enhancing ridges, etc. For ease with removal from cavity 16, bevel 22 is used. When tail side 38 is pressed upon, a void with no support (in the form of bevel 22) creates the required leverage action necessary to pop out head side 36 for removal of write enabling device 10 from cavity 16. Flange extension 26 is also used to prevent incorrect installation into cavity 16.

13 Claims, 6 Drawing Sheets

WRITE ENABLE DEVICE

This application is a CIP of application Ser. No. 08/461,709, filed Jun. 6, 1995, U.S. Pat. No. 5,699,217.

BACKGROUND—FIELD OF INVENTION

This invention relates to Write Enable devices, specifically to such devices which are used for enabling the recordability of recording media.

BACKGROUND—DESCRIPTION OF PRIOR ART

Video or Audio cassette normally comes manufactured with a recording safety tab opening. Devices for selectively enabling or disabling the write feature of cassette players/recorders have been known in the art for many years. In one common device, a breakout tab resides over a write protect detection cavity or recording safety cavity in the housing of the cassette. The breakout tab prevents a detector located in the player/recorder from entering the recording safety cavity and thereby permits writing or recording on the cassette. When the break-out tab is permanently removed by rupturing the connection with the housing of the cassette, the detector can enter the recording safety cavity and thereby prevent writing or recording. A problem exists in that once the break-out tab is removed, it cannot be replaced and therefore the cassette cannot be used to record again. Sometimes this irreversible feature is overcome by utitilizing adhesive tape to cover the recording safety cavity. However, oftentimes the adhesive tape does not have sufficient strength to resist the detector as it attempts to enter the cavity.

Numerous prior art devices have addressed the write enable/protect requirement in a variety of ways. For example, U.S. Pat. No. 4,348,707 shows a magnetic tape cassette for a tape recorder, having at least one erase interlock device including an actuating member movable over a defined path in the cassette between an operating position in which an opening in the housing is uncovered, and a position in which the opening is closed. U.S. Pat. No. 4,737,876 defines a magnetic record disk assembly including a floppy disk located within a rigid case having integral case stiffeners, wiping force appliers and floppy disk stabilizers. A write protect device includes a piece that is mounted to rotate through an arc of 180° in a plane perpendicular to a side surface of the case for opening and closing a sensing aperture within the case.

U.S. Pat. No. 4,757,407 depicts a protective tab for floppy disks having an opening that is designed to be covered to prevent accidental erasure of any recording thereon. The protective tab has an integral clamshell construction such that it can be pried open to be positioned over the floppy disk jacket opening and snapped closed to engage the border of the floppy disk jacket opening and snapped closed to engage the border of the floppy disk jacket and cover the opening. U.S. Pat. No. 4,771,354 discloses a write protect clip that can be permanently installed on a floppy disk and thereafter can be moved to an opened position which exposes the write protect notch of the floppy disk or to a closed position which covers the notch.

U.S. Pat. No. 4,796,138 comprises a write protect shutter in a magnetic disk cartridge in which the two case walls are joined by a boss around which legs of the shutter slide. The legs are formed with indentations to avoid protrusion and the joint. U.S. Pat. No. 4,805,061 describes a write protect mechanism for a computer disk cartridge having tow plates. The write protect mechanism comprises a button visible through an aperture in one of the plates and slidably moveable in the aperture between a write protect position and a write enabled position. U.S. Pat. No. 4,816,954 consists of a slidable insert for blocking the disk write arm notch of diskettes used in computers. The slidable insert is pushed in one direction to block the notch, and pushed in the opposite direction to unblock the notch.

U.S. Pat. No. 4,844,378 includes a magnetic tape having an improved mistake erasure preventing device. A cylindrical body is rotatably mounted in the rear corner of the body of the cassette. U.S. Pat. No. 4,860,142 shows a flexible magnetic recording medium contained in a protective jacket used for storing digital computer information. A continuously lockable shutter is inserted into the containment jacket. U.S. Pat. No. 4,875,109 defines a recording cassette having a latch that pivots between two positions. A plug at one extremity of the latch either blocks or unblocks a record/not record opening at an under wall of the cassette. U.S. Pat. No. 4,908,725 depicts an erase prevention device for use in a recording medium casing to selectively inhibit recording on a recording medium. The device comprises coaxial holes formed in the recording medium casing to provide injection passage.

U.S. Pat. No. 5,418,672 also depicts an erase prevention device which can be removable and replaceable for the recording safety opening. Yet, another U.S. Pat. No. 5,539,600 depicts a slide component configured to be inserted into a recess of an assembled magnetic diskette cartridge and rotated about an edge of the slide component into operable orientation to be slideably positioned between locations in the recess that designate whether or not the magnetic disk in the cartridge is write-protected.

My own co-pending (parent) patent application (Ser. No. 08/461709, Filed 1995, Jun., 6) describes a first planar member or a frame surrounding an aperture which is inserted into a recording safety cavity of a recording medium. A second planar member is then rotatably or slidably attached to the first planar member for covering or uncovering the recording safety cavity, in order to write enable or write disable as necessary.

European Patent Application 85109223.9 discloses a plug element slidable with a reference opening of the cassette. The cassette information is derived by a sensor or positioning pin of the player/recorder which senses the plug position.

Some of the major differences between my current patent application and my co-pending (parent) patent application (Ser. No. 08/461709, Filed 1995, Jun., 6) are:
1. different shape, especially the different profile.
2. different way of operation, arising out of different mechanism or principle involved.
3. whereas my co-pending (parent) patent application (Ser. No. 08/461709, Filed 1995, Jun., 6) is basically meant more for the plastic injection molding method of manufacturing. My current patent application allows not just for plastic injection molding method of manufacturing but also for easier application of plastic extrusion technology as well. Plastic extrusion technology in this case, can be considered to be simpler, more economical and cost-effective.
4. my current patent application has flanges, ridges and fins, etc., each of which kind forms:
   a) a continuous line. Compared with the case of my co-pending (parent) patent application's (Ser. No. 08/461709, Filed 1995, Jun., 6) friction ridges, which may also have at least one break inbetween. With such inbetween breaks, plastic extrusion method can not be easily applied for manufacturing.

b) a straight line. As against my co-pending (parent) patent application's (Ser. No. 08/461709, Filed 1995, Jun., 6) flanges, ridges and fins, etc., which may also be at right angle to each other. For example, in the case of a planar member with a set of four flanges, with each flange at right angle to each other, thereby forming a frame surrounding the planar member's aperture.

With my current patent application having flanges, ridges and fins, etc., in a substantially straight and continuous line, plastic extrusion as well as plastic injection molding or even many other kinds of manufacturing of my invention is possible.

All the related prior arts or inventions (especially, those recording media that do not have built-in on/off switchable write enable and disable means), heretofore known suffer from a number of disadvantages:

1. the more cost-effective plastic extrusion technology can not be easily employed to manufacture the proposed write enabling device as described in my own co-pending (parent) patent application (Ser. No. 08/461709, Filed 1995, Jun., 6).
2. many of current recording media (usually those without built-in on/off switchable write enable means) lack the easy switchability of write enable/disable capability.
3. do not employ the kind of leverage effect as used in the write enabling device of this invention. This leverage effect is caused by a void with support deprivation (such as by using a bevel) on one side of the underside of my write enabling device. With this leverage effect, it is then possible to tip over said side and thereby popping the opposite side for removal.
4. even if the easy switchability of write enable/disable is available, the easy removability and thereby portability from one recording medium to another is not available.
5. do not make fuller use of the recording safety cavity of a recording medium and therefore better management and protection of recording media and their recording capability.
6. do not offer easy attach and simple detach capability of write enabling device.
7. material normally used on a typical recording medium usually does not provide more than one color or tone, necessary to create contrast for:
   a) more awareness as added warning to alert to the danger of imminent recording or write over of whatever existing information. This can prevent probable accidental erasure.
   b) enlivening the job of recording (as when more bright multi-colors are used).
8. Many users of such recording media do not break the breakout tab for the following reasons. Breaking the breakable tab can mean:
   a) problem with finding a suitable substitute for the recording safety cavity tab or write protect detection cavity tab when needed.
   b) accidental erasure or write over of existing information.
   c) missed recording while looking for that substitute which is usually the adhesive tape.
   d) even with the adhesive tape found, recording may be further missed because of possible suitability problem, resulting in tinkering and fumbling around. Moving the recording medium in and out from recording machine, just to persuade the recording machine to record is not a pleasant exercise.
9. The current art device commonly in use for write enable or disable today is the adhesive tape. Despite all the recording media manufacturers' suggestion, the adhesive tape is not really a suitable substitute for the broken off tab. This is essentially due to the following reasons:
   a) the adhesive tape usually is not strong enough to stand the substantial pressure exerted by the recording machine's write enable detect probe or simply—the detector. So, many times, the recording machine will not record and usually eject the recording medium. In other words, it could mean unpleasant, unpredictable or intermittent recording.
   b) the adhesive tape can often be sticky and messy to handle.
   c) as everyone might know, once stuck onto a surface, the adhesive tape can often be very frustrating and hard to peel off when not needed.
   d) it is especially difficult, if portion or portions of adhesive tape breaks off and can not be peeled away. It can be a nightmare.
   e) it can leave behind dirty-looking, gluey, sticky mess which provides the possibility of dust and debris collection and so making it even more bad-looking.
   f) can not be used repeatedly, bad for not encouraging recycling and reuse habit even though adhesive tape pieces are physically quite small.
10. generally speaking, there can be more ways to modify the depth of a cavity or a trench or a groove or simply the degree of depth. The modification of which includes patching or covering up of the cavity as well as easy and quick removal of the above-mentioned modification. The removal is by way of a bevel to create a leverage effect.

Objects and Advantages

Accordingly, besides the objects and advantages of the write enabling device described in my above patent, several objects and advantages of the present invention are:

1. the use of more economical method of plastic extrusion to manufacture this write enabling device, even though injection molding is also still possible. This method of plastic extrusion can not be easily applied in my co-pending (parent) patent application (Ser. No. 08/461709, Filed 1995, Jun., 6).
2. many of current recording media (those that lack built-in on/off switchable write enable means), will have more convenient selectivity of recording or not recording option with a certain level of reliability.
3. a leverage effect caused by not having support (by way of having a bevel) on one side of the underside of the write enabling device of this invention. With such leverage effect, it is then possible to pop up the other side for easy removal.
4. portability, combined with simple installation and removability from a recording medium at will. In other words, it can be moved from one recording medium to be used on another as is needed.
5. enhanced management of recording media and their recording capability by realization of fuller potential and usefulness of the recording safety cavity (which is such an overlooked capability that it is about time, more use is made of it).
6. easy attachment and simple detachment of write enable device of this invention on a recording medium.
7. material used for the write enable device of this invention, can be more than one color or tone for:
   a) help with warning about the danger of imminent erasure or write over of whatever existing information.

b) brightening up the monotony of recording when more colors are used.

8. With the break out tab broken (which is actually meant to be broken anyway, to be really useful), this invention:
   a) provides a ready substitute for the broken off tab.
   b) provides more recording security by preventing accidental erasure of previous recording.
   c) helps avoid missed recording while looking for a suitable substitute such as a piece of adhesive tape.
   d) helps avoid further missed recording, due to the fact that, even after finding the adhesive tape, recording may be further missed because of problems inherent with an adhesive tape, resulting in tinkering and fumbling around or simply putting the recording medium into and out of the recording machine, just to persuade the machine to record.

9. Unlike the adhesive tape, the write enabling device of my invention:
   a) provides predictability of recording or not recording at will with a high degree of certainty.
   b) provides more strength than the adhesive tape does. Without that required strength, the recording machine will not record and will usually eject the recording medium.
   c) provides non-sticky and non-messy alternative solution to avoid the gluey messy residue which means no dust-collecting ugly spots.
   d) helps avoid frustration associated with looking for a starting tab in a stuck adhesive tape (to peel off for removal).
   e) will not create a situation such as, when portion or portions of adhesive tape will not be peeled away and instead breaks off and still be stuck onto the surface. This can be a real problem.
   f) is environmentally friendly by encouraging recycling and reuse and cut down unnecessary waste.

10. it can become a means or method to change the depth of a cavity or a trench or a groove or simply a depth. The modification can include patching or filling up of the cavity as well as quick removal of the change by leverage effect due to a bevel.

Further objects and advantages are to provide a write enabling device, which can be used easily and conveniently to write enable or disable a recording medium with an acceptable level of certainty and reliability. This allows a person the freedom to break off the recording safety cavity tab without concern about getting a reliable substitute, which can be used repeatedly, and thereby obviates the need to use adhesive tape. Still further objects and advantages will become apparent from a consideration of the ensuing descriptions and drawings.

BRIEF DESCRIPTION OF THE DRAWINGS

In the drawings, closely related figures have the same number but different alphabetic suffixes.

DETAILED DESCRIPTION OF THE DRAWINGS

Figure 1A:
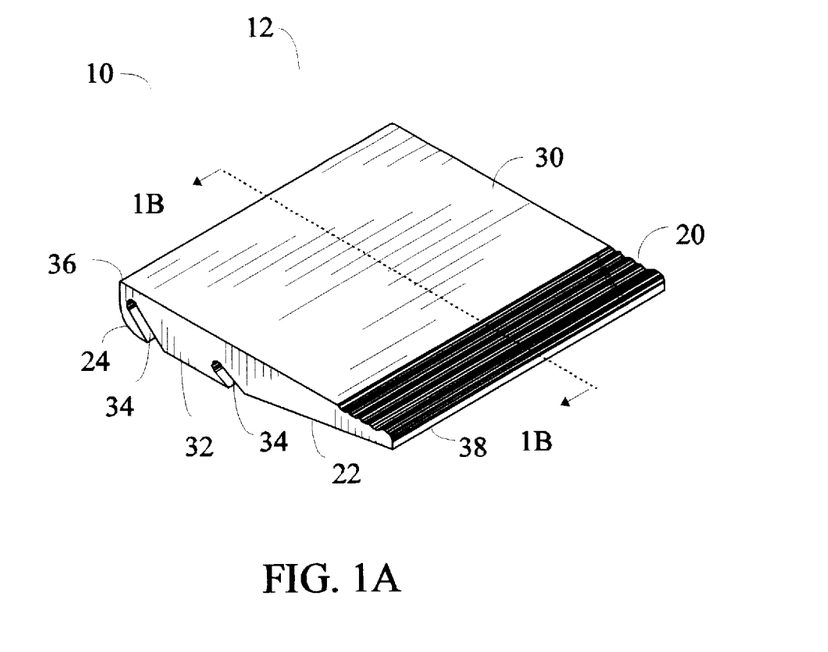
FIGS. 1A and 1B show the perspective and end views of the first embodiment of the write enabling device with a bevel.
Figure 1B:
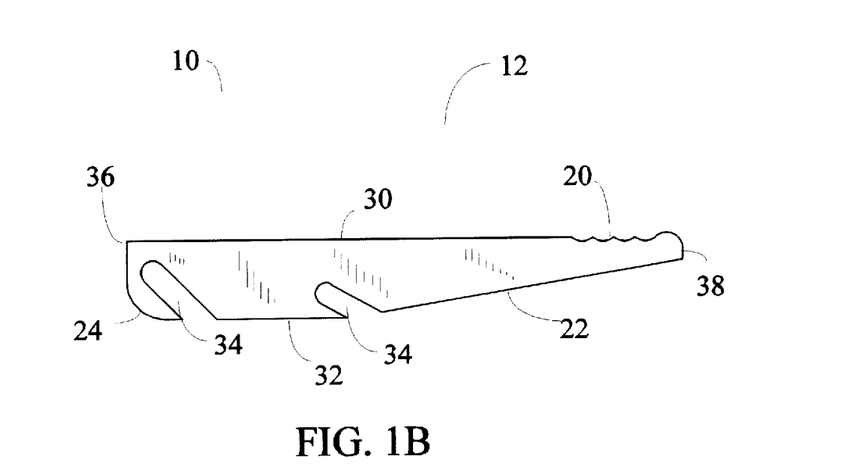
Figure 2A:
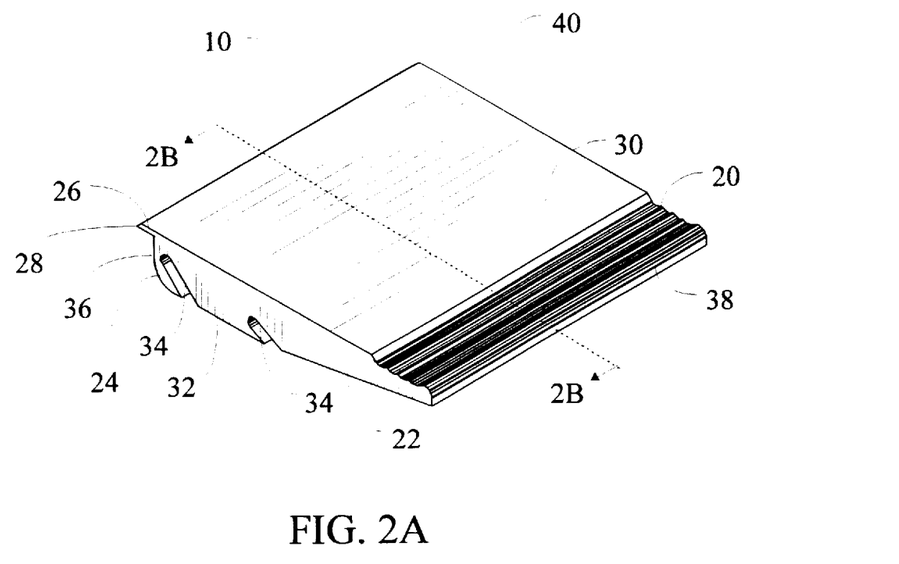
FIGS. 2A and 2B show the perspective and end views of the second embodiment of the write enabling device with a bevel and a flange extension.
Figure 2B:
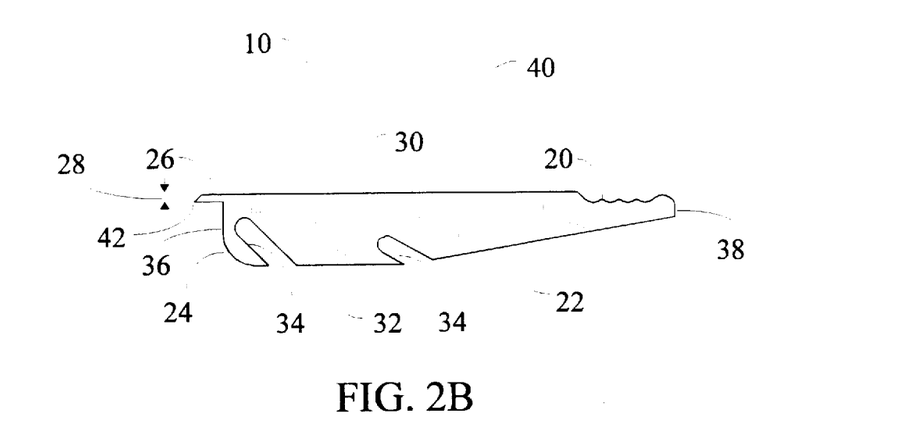

Description—FIGS. 1 to 2

The present invention is directed to a write enabling device 10 and method for use with a recording medium such as a video or audio tape cassette, which has a recording safety cavity. Tape cassettes are typically provided with a break out tab (not shown), which initially covers recording safety cavity 16. In this configuration, when the cassette is put into the cassette reorder such as video cassette recorder (V.C.R.), a detector senses that the recording safety cavity is covered and recording (writing) is permitted.

Conversely, if the tab is removed, the detector moves into cavity and thereby prevents recording. The write enabling device has several embodiments, all of which call for the selective covering of cavity 16 of the recording medium by insertion of write enable device into the recording safety cavity, thereby resulting in write enabling. Removal of the write enabling device in turn, disable the recording machine via that recording medium. Actually whether covering of cavity 16 is considered write enabling or disabling, can all depend upon the kind of recording machine used. By normal convention, covering of cavity 16 means write enabling and uncovering means disabling the write feature of a recording machine on that recording medium.

Description of first embodiment—FIGS. 1A to 1B.

The first embodiment 12 of write enabling device of the present invention is illustrated in FIG. 1A (perspective view) and FIG. 1B (end view) viewed in the direction of line 1B—1B of FIG. 1A.

The first embodiment 12 of write enabling device 10 substantially shaped in the form of a hexahedron plug fabricated from a resilient material. It has a top side 30, connected by four faces to an opposite and substantially parallel underside 32. A void with no support on one side (tail side 38) of underside 32 (one example is by having a bevel 22) makes underside 32 to be of smaller surface area than the area of opposite top side 30. Additionally, this creates a thicker head side 36 and a progressively thinner tail side 38, thereby somewhat forming a wedge shape or profile. The edge between the underside 32 and head side 36 is substantially rounded to form a a rounded edge 24. Also on top side 30, there is a plurality of friction enhancing ridges 20 parallel to bevel 22. The friction enhancing ridges 20:
   identifies tail side 38.
   provides a more positive fingergrip.

The head side 36 is opposite of and parallel to tail side 38. The underside 32 also has at least one groove 34 (which in this case has two grooves 34) parallel to bevel 22. Each groove 34 is substantially angled forward towards head side 36 or in other words—forwardly directed. Actually, each groove 34 may or may not necessarily be forwardly directed (or groove 34 itself, may not even be necessary at all) as long as there is adequate resilience and thus adequate retention in recording safety cavity 16, when installed therein.

Description of second embodiment—FIGS. 2A to 2B.

Second embodiment (FIG. 2A and 2B) is exactly the same as first embodiment, except it has at least one flange extension 26 with bevelled edge 42. Flange 26 is to prevent incorrect insertion into cavity 16 in an upside down manner. Thickness 28 of flange extension 26 is selected so as not to interfere with the operations of the recording medium 14 as well as the recording machine.

Both embodiments can be made by the method of plastic extrusion although injection molding as well as other manufacturing methods are also possible. This is what makes the major difference between this patent application from my co-pending (parent) patent application, Ser. No. 08/461709, Filed 1995, Jun., 6. From the description above, a number of advantages are evident:

1. more economical method of plastic extrusion can be more easily used to manufacture this write enabling device.
2. much easier switchability of write enable/disable capability.
3. easy removal—taking out support (via having a bevel) on one side of the underside of the write enabling device of this invention, causes the required leverage effect necessary to pop up the other side for removal.
4. portability from one recording medium to another.
5. better management and control of recording media and their recording capability and bring out the usefulness of the recording safety cavity into fuller utilization.
6. both installation and removal are relatively quick and simple.
7. a typical recording medium does not normally come more than one color or multi-tone. This invention can:
    a) put more fun into recording by adding more color.
    b) promote awareness and thus a reminder to alert to the danger of impending recording and so—erasure of whatever existing information. This helps eliminate accidental erasure.
8. For all the advantages that can result from breaking the break out tab, it can still be a real dilemma. Broken break out tab can present the following problems:
    a) potential problem with finding a suitable substitute for the recording safety cavity tab.
    b) more control of recording with less chance for accidental erasure or write over.
    c) with an unsuitable substitute, certain kind of recording machine may still not record.
9. The current art substitute for the break out tab as suggested by most recording media manufacturers is the adhesive tape which is not really a good substitute because:
    a) the adhesive tape usually has to stand the substantial pressure exerted by the recording machine's write enable detect probe. So if the adhesive tape is weak, the recording machine will not record at all. Or recording can be very intermittent or at best unpredictable.
    b) adhesive tape can be quite messy and sticky, and can sometimes leaves behind dirty-looking, gluey residual mark which can collect dust and debris.
    c) peeling off to remove stuck adhesive tape can be quite a painful experience, as everyone might know.
    d) the real headache is, if portion or portions of adhesive tape can not be peeled away and instead breaks off into small patches of stuck adhesive tape.
    e) normally, adhesive tape can not be used over and over again.
10. fast and quite simple way to modify the depth of a cavity or a groove or simply a depth, the modification includes patching or covering up of the same as well as a method of easy and quick removal of the above-mentioned modification or patch-up. The removal helped by the leverage effect due to a bevel.

Figure 3:
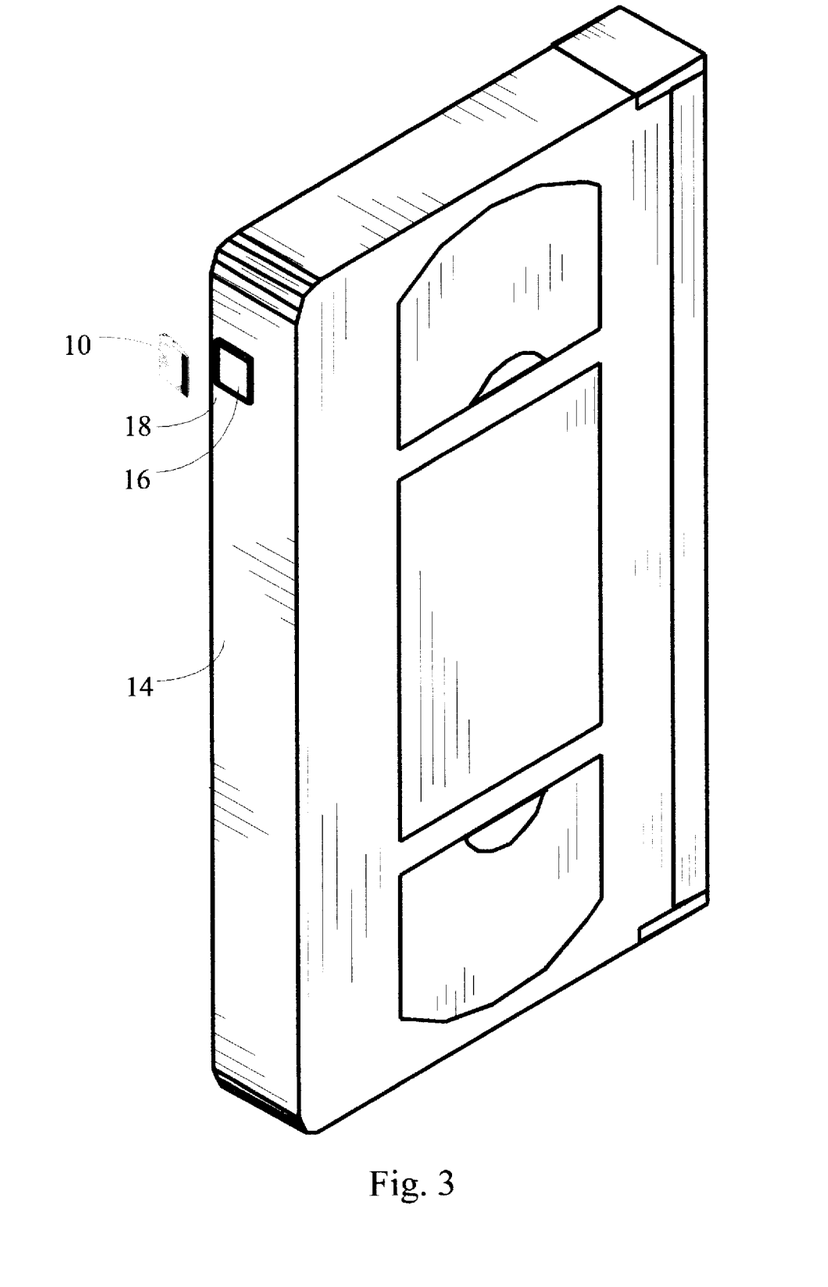
FIG. 3 shows the recording medium, with the first embodiment of write enabling device in position for installation into recording safety cavity.
Figure 4A:
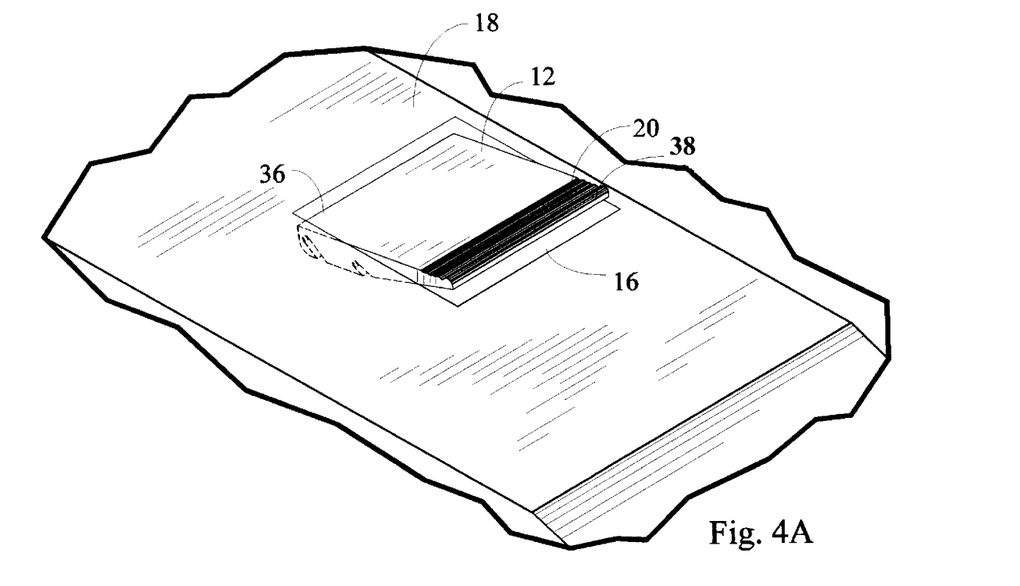
FIG. 4A shows the first embodiment of write enabling device in the process of being installed.
Figure 4B:
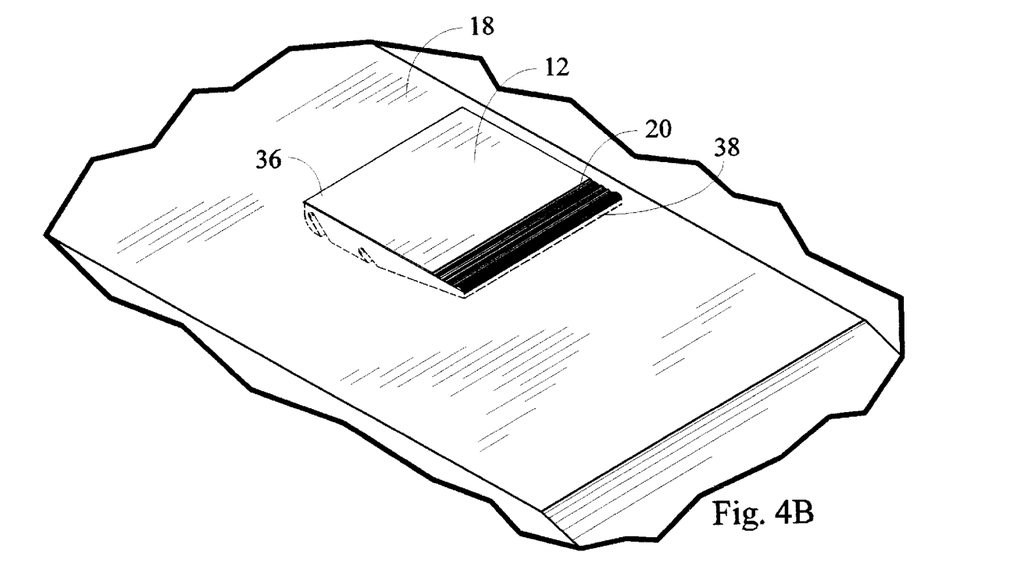
FIG. 4B shows the first embodiment of write enabling device already installed.
Figure 4C:
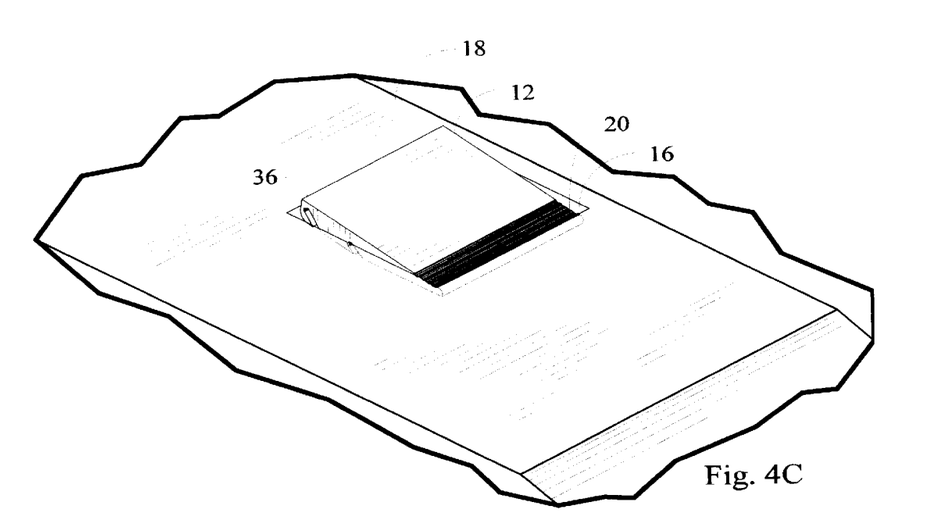
FIG. 4C shows the first embodiment of write enabling device in the process of being removed.
Figure 5A:
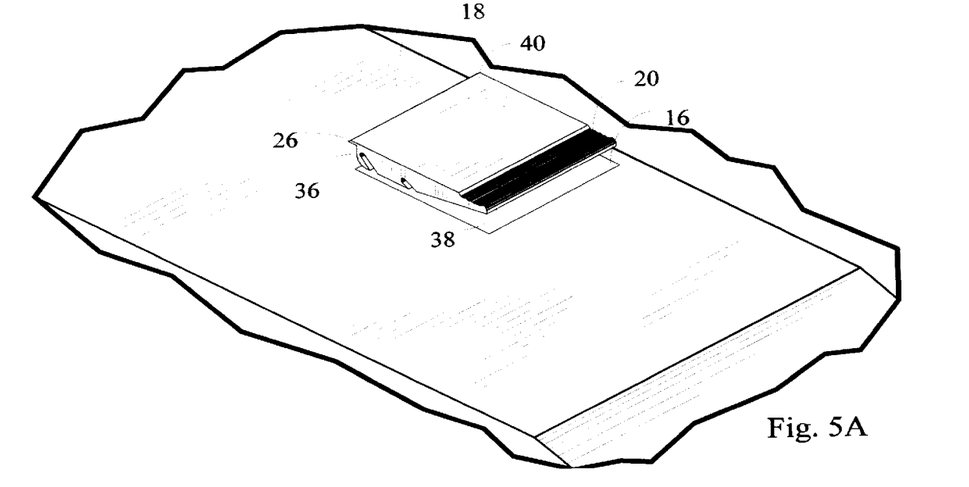
FIG. 5A shows the second embodiment of write enabling device in the process of being installed.
Figure 5B:
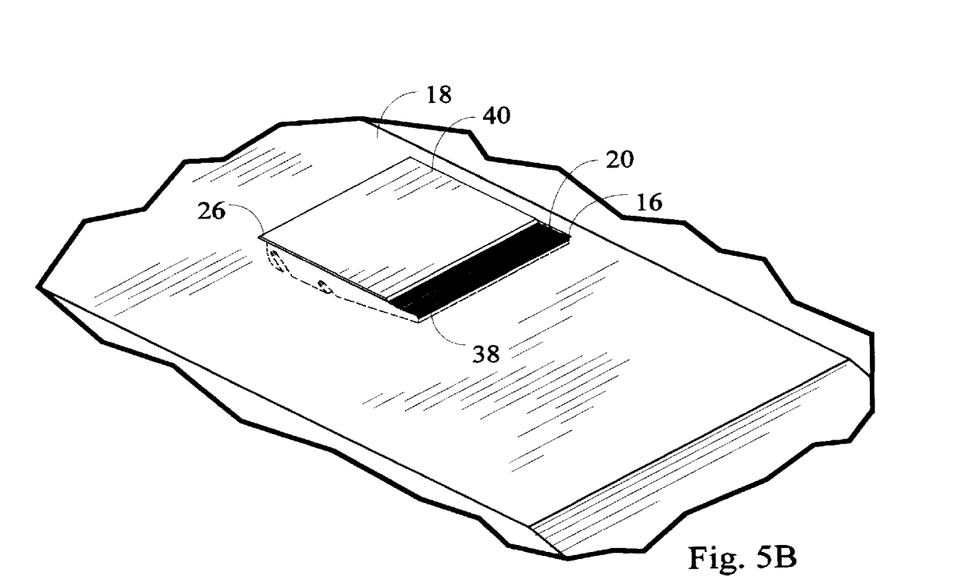
FIG. 5B shows the second embodiment of write enabling device already installed.
Figure 5C:
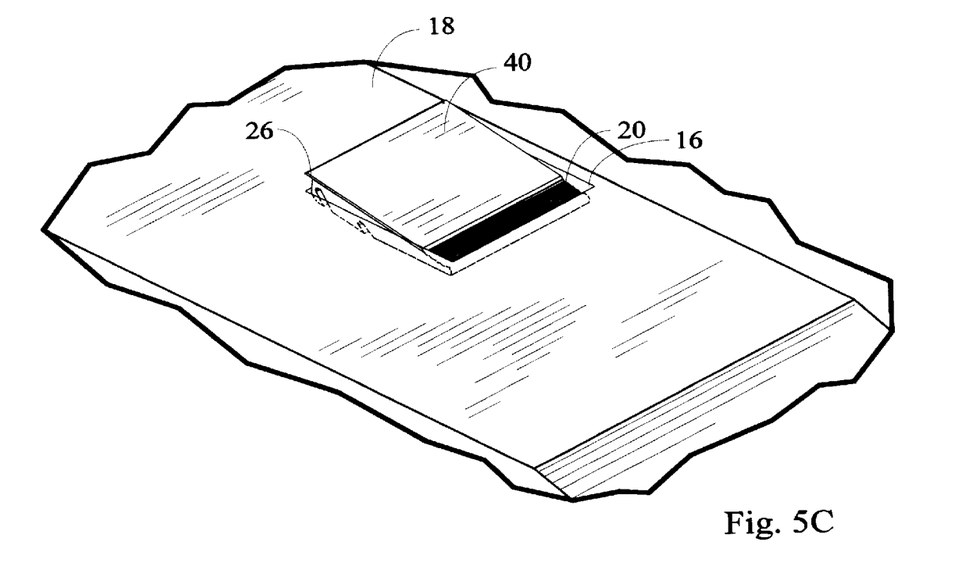
FIG. 5C shows the second embodiment of write enabling device in the process of being removed.

Operation—FIGS. 3 to 5

Basically, for first embodiment 12 it is just a press-in installation by inserting head side 36 in, first and pressing at about the center of top side 30 into cavity 16. For the second embodiment, installation is just by pressing at about the center of write enabling device 10 into cavity 16. When installed, both embodiments of write enabling device 10 is inserted as deeply as possible with substantially tight retention in cavity 16. Additionally, with first embodiment 12, write enabling device 10 is also to be substantially flush with the surrounding area 18 of cavity 16.

For first embodiment 12 and second embodiment 40, removal is by pressing on tail side 38 which is identifiable by friction enhancing ridges 20 and thereby popping up head side 36 for removal. This is due to bevel 22, which is actually a void with no support on one side (i.e.—tail side 38) of underside 32. This bevel 22 creates the leverage action necessary to pop up head side 36. Additionally, rounded edge 24 also helps with easier removal.

Unlike the first embodiment 12, the second embodiment 40 virtually can not be installed incorrectly upside down due to flange extension 26. With first embodiment 12, when installed incorrectly (in other words—upside down way), removal of write enabling device 10 can be done by engaging groove 34 or the side between head side 36 and tail side 38, with either finger tip or a flat object and then removed.

Due to the substantially square shape of top side 30, there are four possible ways or orientations for insertion into recording safety cavity 16. The orientation for insertion of both embodiments of write enabling device 10 can be in any one of four possible orientations, as long as:

each embodiment is installed with top side 30 always up.
there is no interference with the operation of the recording medium as well as the recording machine, including but not limited to the movement of recording medium into and out of the recording machine.
write enabling device 10 is substantially snug, tight (and also flush, if it is the first embodiment 12) as possible when installed in cavity 16.

Operation of first embodiment—FIGS. 3, 4A to 4C.

The manner of using first embodiment 12 to allow recording on the recording media (in this case, a tape cassette) is just to dip or insert head side 36 first into recording safety cavity 16 (FIG. 4A) and then press in at about the center of top side 30 to embed or attach or install into cavity 16. When installed (FIG. 4B), first embodiment 12 should be substantially flush and tight as possible with surrounding area 18 of recording safety cavity 16. Substantial tight fitting and adequate retention in cavity 16 is possible due to head side 36 and opposite tail side 38 being compressed against each other, thereby exerting force on the walls of cavity 16.

For removal (FIG. 4C)—while steadying head side 36 (because it can jump), press on tail side 38 (as indicated by the presence of friction enhancing ridges 20), to pop up head side 36 for lift off and subsequent removal. This is due to tipover or leverage effect caused by having a void with no support (in the form of a bevel 22) on underside 32 of tail side 38. Rounded edge 24 also helps with easier removal.

When incorrectly (i.e.—in upside down way) installed, the side between head side 36 and tail side 38 or even grooves 34 can be engaged by fingertips or a flat object for removal. Other ways of removal, however, may also be possible and used.

Operation of second embodiment—FIGS. 5A to 5C.

The manner of using second embodiment 40 to allow recording (FIG. 5A) on recording medium 14 (in this case, a tape cassette) is just by pressing at about the center of top side 30 to insert into cavity 16. Once installed, second embodiment 40 is inserted substantially tight and deep into cavity 16 (FIG. 5B). Substantial tight fitting and retention in cavity 16 is possible, due to head side 36 and opposite tail side 38 exerting force on the walls of cavity 16. To remove (as shown in FIG. 5C), while steadying head side 36 (because it can jump), pressing at tail side 38 (as identified by friction enhancing ridges 20), will pop up head side 36. Moreover, rounded edge 24 also assists easier removal. Flange extension 26 on second embodiment 40 is to make incorrect or upside down installation virtually impossible.

Summary, Ramifications, and Scope

Accordingly, the reader will see that write enabling device 10 of this invention can be conveniently used to selectively enable or disable the writing over or recording capability of a recording medium in a recording machine. The removal is a lot easier than a typical adhesive tape. Think of all the difficulties such as looking for a starting tab to hold onto for peeling off the adhesive tape. Also, when being peeled off a surface, a typical adhesive tape used to break away to form smaller and 'still stuck' pieces. This makes peeling off more difficult than ever. Even after removal, the adhesive tape sometimes have a tendency of leaving behind an ugly, sticky, messy glue residue to collect dust and debris, a definite aestethically undesirable sight.

Furthermore, the write enabling device has the additional advantages in that:

1. in addition to plastic injection manufacturing and other possible manufacturing methods, this invention also more easily permits the use of plastic extrusion technology, which can be much more economical, to produce this write enabling device. My own co-pending (parent) patent application (Ser. No. 08/461709, Filed 1995, Jun., 6) does not allow this.
2. it permits some existing recording media (generally, those without built-in on/off switchable write enable means) to enjoy the convenience and selectability between the write enabled and disabled states or modes with an acceptable level of certainty or reliability.
3. underneath one side of the underside of the write enabling device of this invention, a void with no support is deliberately created by having a bevel. This causes the desired leverage effect to pop up the other opposite side for easy removal.
4. it can be environmentally helpful due to the portability and reusability, helped along with simple installation and removal from a recording medium at will. In other words, a person only needs a few units of my invention, which is portable, reusable, recyclable and thereby reduces waste.
5. fuller potential and usefulness of the recording safety cavity is realized and in a way, enhances management of recording media and their recording capability.
6. easy installation and simple removal of write enable device of this invention, is possible.
7. material used on a typical recording medium does not normally provide more than one colors or tones:
   a) for making recording more fun (as when bright multi-colors are used).
   b) by using brighter color, it also helps alert to the danger of imminent write over of whatever existing information. This can prevent accidental erasure or write over.
8. With the break out tab broken (which is the correct course of action to take), this invention:
   a) provides a ready substitute for the broken off tab.
   b) provides recording security by preventing accidental erasure of previous recording.
   c) avoids missed recording while looking for, tinkering and fumbling around such as moving the recording medium into and out of the recording machine, to urge it to record.
   d) provides better alternative to the adhesive tape because even after finding the adhesive tape, recording may still not be possible because of unsuitable substitute, resulting in further tinkering and fumbling around.
9. Unlike the adhesive tape, this invention also:
   a) provides predictability of recording or not-recording at will with greater certainty.
   b) provides more strength than the adhesive tape does. The strength required to withstand the write enable detection probe of the recording machine. Without that strength, a recording machine will not record and will usually eject the recording medium.
   c) provides non-sticky and non-messy alternative solution to avoid the gluey residue.
   d) does not create dirty, gluey messy residue which can mean no dust-collecting ugly spots.
   e) has no frustrating peeling-off situation to remove a stuck adhesive tape on a recording medium.
   f) especially troublesome is, if portion or portions of adhesive tape can not be peeled away and instead become broken up into smaller patches of adhesive tape and remained stuck onto the surface.
   g) encourages recycling, reuse and thereby reduces waste.
10. it could be a means and method for depth modification of a cavity or a trench a groove or generally a depth, the modification includes depth decrement, which is by patching or covering up of cavity or groove, etc. Depth increment is by removal of the above-mentioned modification or patch-up. The removal is done as mentioned, with the help of leverage action created by a bevel or a wedge shape at one end.

Although the descriptions above contain many specificity's, these should not be construed as limiting the scope of the invention but as merely providing illustrations of some of the presently preferred embodiments of this invention.

For example, instead of top side and parallel underside forming a trapezoidal or wedge-shaped profile, the extrusion profile of write enabling device 10 of this invention can also be substantially more of a triangular shaped extrusion profile, thereby still not compromising the required leverage effect.

This leverage effect or action being caused by a created void with no support underneath one portion (on tail side 38) of write enabling device 10. One way is by having a bevel 22, which results in the above-mentioned trapezoidal or wedge-shaped or triangular profile. With this arrangement, removal is just by pressing on tail side 38. Lacking the support underneath, the tail side 38 will tip over, so the desirable leverage effect to pop up head side 36, which can then be pulled out for retrieval.

Sometimes, with some devices that use this invention, some retention in the place where it is installed, is needed. So, in addition to use of groove 34, for even more enhanced resilience that can in turn increase greater retention, the extrusion profile can also have head side 36 (or any part or portion that can be hollowed out) substantially hollowed out.

Moreover, the head side 36 can also be combined with or replaced by at least one fin or friction enhancing ridge projecting from the face of head side 36. The abovementioned fin or ridge can project from the face of head side 36, preferably but not necessarily, in direction angled toward the underside 32 of the write enabling device 10 (i.e.—downwardly directed). When angled this way, removal from recording safety cavity 16 can be easier and smoother.

The top side's 30 'area' of write enabling device 10 can also have many or any other shapes such as round, oval, oblong, or any imaginable shapes as long as there can still be the required leverage effect. Groove 34 can also be either just one groove or even no such groove at all.

This invention, that utilizes wedge or bevel shape or a void with no support to have leverage action or effect, could be used in many applications. The applications can be as diverse as road repair, filling cavities of any shapes and forms in a surface such as drywall, installing and removal of battery pack in its compartment, electrical or electronic or mechanical unit, or any kind of module, or component or even electrical or electronic contacts into its slot or cavity, just to name a few examples. With electrical or electronic contacts, this invention can also used to establish or disconnect electrical or electronic contacts at will.

The plastic extrusion may be especially suited for manufacturing of this invention but other kinds of manufacturing (for example—blow molding) can also be considered and used if suitable.

Thus the scope of the invention should be determined by the appended claims and their legal equivalents, rather than by the examples given.

I claim:

1. A write enabling device, for use with a tape cassette having a recording safety cavity covered by a breakable tab, said cavity substantially formed by four walls having a first depth and a floor substantially perpendicular to said four walls, comprising:
   a planar member having a top side and an opposite and substantially parallel underside connected by four faces each having a second depth substantially equal to said first depth;
   said underside having a bevel and means for removal of said planar member from said cavity after being installed in said cavity, using said bevel, which creates a progressively thinner tail side, as compared to an opposite thicker head side, thereby providing a required leverage effect, when pressed at said tail side to pop up said head side for removing said planar member from said cavity.

2. The write enabling device of claim 1, wherein said device is substantially sized so that when installed in said cavity, both said head side and said tail side compress against each other to exert outward force on two walls of said four walls of said cavity resulting in said planar member being snugly and tightly accepted and retained by said recording safety cavity, in any possible orientation with said top side facing up.

3. The write enabling device of claim 1, further including a plurality of friction ridges integral with said top side and friction enhancing means as well as identification means to indicate said tail side with the presence of said friction ridges, which is also parallel to said bevel, starting substantially from an edge adjacent to said thinner tail side and then spreading substantially towards a middle portion of said top side and said friction ridges also improve fingertip engagement with its friction enhancing feature.

4. The write enabling device of claim 1, further including at least one groove on said underside of said planar member, parallel to said bevel, and resilience enhancing means for enhanced retention in said cavity as well as removal means to help remove said planar member when installed incorrectly or upside down by using said groove for engagement and subsequent removal.

5. The write enabling device of claim 1, wherein said top side extending beyond a face of said four faces thereby forming a flange, parallel to said bevel, and means for preventing said planar member from being installed incorrectly or upside down by having said flange to increase the size or area of said top side.

6. A write enabling device, for use with a recording medium such as a tape cassette, having a breakable tab which covers a recording safety cavity substantially formed by four walls having a first depth and a floor substantially perpendicular to said four walls, comprising:
   a flat body of material having a top side and an opposite and substantially parallel underside connected by four faces each having a second depth substantially equal to said first depth;
   said underside having a bevel and means for removal of said flat body from said cavity by using leverage effect caused by said bevel, which creates a tail side being thinner as compared to an opposite and parallel thicker head side and thereby also making said top side to become bigger area than said underside which is also substantially flat and still provides a substantially good seating for said flat body of material when inserted into said cavity.

7. The write enabling device of claim 6, wherein both said head side and said tail side compress against each other, thereby exerting outward force on said walls of said cavity resulting in said flat body of material being snugly and tightly accepted and retained by said recording safety cavity, in any possible orientation with said top side always facing up.

8. The write enabling device of claim 7, further including a plurality of identification ridges and friction enhancing means as well as identification means for indicating said tail side due to the presence of said identification ridges integral with said top side, and parallel to said bevel and beginning from an edge along said tail side and proceeding and spreading substantially towards a middle portion of said top side and said identification ridges also useful for enhancing friction and finger tip engagement.

9. The write enabling device of claim 8, further including at least one slot, and resilience enhancing means for increased retention in said cavity as well as retrieval means for removing said flat body of material from said recording safety cavity when installed in an incorrect or upside down way, by using said slot, parallel to said bevel, to facilitate removing said flat body of material from said cavity.

10. The write enabling device of claim 9, wherein said top side extends beyond a face of said four faces thereby forming a flange, parallel to said bevel, and means for preventing said flat body of material from being installed incorrectly or upside down by having said flange, thereby increasing the area of said top side to prevent this kind of incorrect installation.

11. A write enabling device for a tape cassette, having a recording safety opening covered by a breakable tab, said opening substantially formed by four walls having a first depth and a floor substantially perpendicular to said four walls, which said opening is interactable with a recording medium drive machine such that when said opening is blocked, data on said recording medium is erasable and when said opening is unblocked, the data on said recording medium is not erasable, said write enabling device comprising:

a removable and replaceable planar member having a top side and an opposite and substantially parallel underside connected by four faces each having a second depth substantially equal to said first depth;

said planar member either blocks by being inserted into said opening or unblocks by being removed from said opening, respectively, comprising:

a plurality of friction ridges integral on said top side, thereby providing both identification means as well as friction enhancing means to identify a tail side and to help engage finger tip during installation and removal, and further including at least one slot on said underside, which provides resilience enhancing means and thereby increasing retention of said planar member when installed in said opening as well as providing some help in removal of said planar member when said planar member is incorrectly installed in an upside down manner;

said underside having a bevel which creates a thicker head side and said progressively thinner tail side, thereby creating a leverage effect facilitating removal by pressing on said tail side as identified by said friction ridges, thereby popping up said head side which is then pulled out from said opening.

12. The write enabling device of claim 11, when installed in said opening, wherein both said head side and said tail side compress against each other, thereby providing outward force against two walls of said four walls and thereby holding said planar member in said opening.

13. The write enabling device of claim 11, further having said top side extending beyond one of said four faces, thereby forming a flange, parallel to said bevel, said flange increases the area of said top side, thereby providing the means for preventing incorrect or upside down installation of said planar member into said opening.

* * * * *